United States Patent Office 2,899,480
Patented Aug. 11, 1959

2,899,480

METHOD OF MANUFACTURING CADMIUM PLATES FOR NICKEL-CADMIUM BATTERIES

Arthur Fleischer, Livingston, N.J., assignor to the United States of America as represented by the Secretary of the Army No Drawing. Application November 6, 1958
Serial No. 772,387

4 Claims. (Cl. 136—67)

This invention relates to an improvement in the manufacture of cadmium plates for use in batteries of the nickel-cadmium type.

Cadmium plates for nickel-cadmium batteries are made in known manner by repetitive treatment of sintered nickel plaques with cadmium salt solution involving vacuum-soaking of the nickel plaques in the cadmium salt solution and cathodic polarization in alkali hydroxide solution to precipitate the cadmium in the pores of the plaque.

Porous nickel plaques are prepared in known manner by sintering carbonyl nickel powder of low apparent density. These nickel plaques are then impregnated usually with a cadmium nitrate solution containing about 26.5% cadmium. The cathodic polarization of the soaked plaques may be carried out in a nickel can which acts as the anode. Polarization is carried out in a 25% caustic soda or potash solution preheated so that electrolysis takes place between 70 and 80° C. During polarization the cadmium salt is converted into insoluble precipitates within the pores of the plate. The bulk of the precipitate appears to be cadmium hydroxide but both metallic cadmium and cadmium oxide have been identified. Soaking and polarization is repeated until the required amount of cadmium compounds have been absorbed. After polarization the plates are washed and dried at 80° C.

It has been known that the cadmium nitrate solution has a tendency to dissolve some of the nickel from the sintered nickel plaque. In the course of the repeated treatment the nickel dissolved in the cadmium nitrate solution will precipitate together with the cadmium precipitate and thus decrease the capacity of the cadmium electrode on cycling.

It has now been found that by adding polyethylene glycol to the original cadmium nitrate solution the tendency of this solution to dissolve some of the nickel from the sintered plaque is greatly decreased. Analysis of cadmium nitrate solutions used in the impregnation of nickel plaques have shown a substantial decrease in the amount of nickel dissolved during the impregnation in a cadmium nitrate solution containing polyethylene glycol. The decrease in the amount of nickel dissolved on impregnation in a cadmium nitrate solution containing polyethylene glycol compared to that dissolved on using pure cadmium nitrate solution is of the order of 65 to 85% and has been determined in the following manner.

Sintered nickel plaques, 0.026–0.029 inches in thickness, having the dimensions of $1\frac{15}{16}$ by $2\frac{1}{4}$ inches were placed in a small plastic jar and separated with plastic rods. The jar was placed in a vacuum impregnating apparatus having provisions for sucking in the desired solution and for pumping out the system. After attaining a vacuum of less than about 10 mm. Hg pressure the impregnating solution was syphoned in controlling the rate of flow to effect the transfer in about one minute. A volume of about 63 to 65 ml. was used. After five minutes of soaking, the vacuum was broken and the plates were removed with tongs allowed to drain a minute, and then the solution was recovered, measured and analyzed for nickel. Care was taken to use only such reagents that would assure the absence of interference with the nickel deterioration.

In order to study the amount of soluble nickel in the pores of the plaques they were transferred directly to a 500 ml. flask containing Muspratt solution (5 g. $NH_4Cl$, 20 ml. concd. $NH_4OH$, 70 ml. $H_2O$) and shaken for two hours in a nitrogen atmosphere. The solution was separated for nickel determination while the plaques were washed, dried and weighed.

All impregnations were carried out with cadmium nitrate solutions prepared from cadmium oxide and C.P. nitric acid, having 517.3 grams cadmium per liter and 3.22 grams from nitric acid per liter. Various polyethylene glycols having average molecular weights from about 200 to 9,000 were added as inhibitors. The plaques had an area of 4.36 square inches and were sintered with 20 by 20 mesh nickel grid of 0.007 inch nickel wire diameter.

Without the addition of polyethylene glycol an average of 34.15 mg. of nickel per cubic centimeter of plaque was dissolved. Using polyethylene glycol of molecular weights varying from 200 to 9,000 in concentrations of 1 gram of glycol per liter the amount of nickel dissolved in milligrams per cubic centimeter of plaque varied from about 3.8 to 12.0 depending on the molecular weight of the polyethylene glycol, other conditions remaining equal. In general, it has been found that optimum results may be achieved by using a polyethylene glycol having an average molecular weight of about 6,000.

To manufacture sintered cadmium electrodes according to the invention the active cadmium mass is introduced into the pores of the plaques by means of the well-known 4-step process consisting of soaking the plaques in a cadmium nitrate solution, cathodic polarization of the soaked plates in alkali solution, washing the plates and drying as, for instance, described in detail in the article "Sintered Plates for Nickel Cadmium Batteries," Journal of the Electrochemical Society, vol. 94, No. 6, December 1948. The present invention differs from this known procedure only in that polyethylene glycol is added to the cadmium salt solution with which the plaques are impregnated. Preferably, about 1 gram of polyethylene glycol per liter of cadmium salt solution is added. In general, it has been found that polyethylene glycols of higher molecular weight up to about a molecular weight of 8,000 give satisfactory results while molecular weights above 8,000 are less desirable.

Nickel cadmium batteries made with cadmium electrodes manufactured with the help of subject invention tend to show an extremely small loss in capacity on cycling. Even this small loss is recovered to almost the initial average capacity within a few weeks.

It will be obvious to those skilled in the art that various changes may be resorted to in the method of making cadmium electrodes with the help of inhibitors of the polyethylene glycol type without departing from the broad inventive idea defined in the following claims.

What is claimed is:

1. A method of manufacturing cadmium plates from sintered nickel plaques comprising impregnating the plaques in a cadmium salt solution, cathodic polarization of the soaked plates in alkali solution, washing and drying the plates characterized in that polyethylene glycol is added to said cadmium salt solution said polyethylene glycol being used in a concentration of about 1 g. per liter of cadmium salt solution.

2. A method of manufacturing cadmium plates according to claim 1, in which said polyethylene glycol has an average molecular weight of from 200 to 9,000.

3. A method of manufacturing cadmium plates according to claim 1, in which said polyethylene glycol has an average molecular weight of 6,000.

4. A method of manufacturing cadmium plates according to claim 1, in which the nickel plaques are impregnated with a cadmium nitrate solution containing about 26.5% cadmium and about 1 gram polyethylene glycol, of an average molecular weight of 6,000, per liter of said cadmium nitrate solution.

References Cited in the file of this patent

UNITED STATES PATENTS

| | | |
|---|---|---|
| 2,519,399 | Roberts | Aug. 22, 1950 |
| 2,870,234 | Moulton | Jan. 20, 1959 |

OTHER REFERENCES

"Journal of the Electrochemical Society," vol. 94, No. 6, 1948, article by Fleisher, pages 289–299.